United States Patent
Yamashiro et al.

(10) Patent No.: US 10,378,696 B2
(45) Date of Patent: Aug. 13, 2019

(54) THERMAL INSULATING STRUCTURE

(71) Applicant: KAWASAKI JUKOGYO KABUSHIKI KAISHA, Kobe-shi, Hyogo (JP)

(72) Inventors: Kazuto Yamashiro, Akashi (JP); Tatsuya Imai, Akashi (JP); Osamu Muragishi, Kakogawa (JP); Ryosuke Uraguchi, Kobe (JP); Takashi Koumoto, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 15/752,033

(22) PCT Filed: Jul. 29, 2016

(86) PCT No.: PCT/JP2016/003517
§ 371 (c)(1),
(2) Date: Feb. 12, 2018

(87) PCT Pub. No.: WO2017/026101
PCT Pub. Date: Feb. 16, 2017

(65) Prior Publication Data
US 2018/0231183 A1 Aug. 16, 2018

(30) Foreign Application Priority Data
Aug. 10, 2015 (JP) .................................. 2015-157924

(51) Int. Cl.
*F16L 59/065* (2006.01)
*F17C 3/08* (2006.01)
(Continued)

(52) U.S. Cl.
CPC .............. *F17C 3/08* (2013.01); *F16B 5/0642* (2013.01); *F16B 37/061* (2013.01); *F16L 59/02* (2013.01);
(Continued)

(58) Field of Classification Search
CPC ............. Y10T 428/197; Y10T 428/192; Y10T 428/231; F16L 59/065; E04B 1/803; Y02B 80/12; F25D 2201/14
See application file for complete search history.

(56) References Cited

U.S. PATENT DOCUMENTS 5,259,758 A 11/1993 Lauersdorf

FOREIGN PATENT DOCUMENTS

| JP | S49-132776 U | 11/1974 |
| JP | S55-076287 A | 6/1980 |

(Continued)

OTHER PUBLICATIONS

Sep. 13, 2016 Search Report issued in International Patent Application No. PCT/JP2016/003517.

*Primary Examiner* — Alexander S Thomas
(74) *Attorney, Agent, or Firm* — Oliff PLC

(57) ABSTRACT

A thermal insulating structure includes: at least two first multilayer vacuum insulators that adjoin each other and that cover a to-be-insulated surface; a retainer that is fixed to the to-be-insulated surface and that protrudes from a boundary between the first multilayer vacuum insulators; a second multilayer vacuum insulator that extends along the boundary and that covers the boundary, the second multilayer vacuum insulator including a through-hole formed therein, in which the retainer is inserted; and a keep plate that is fixed to the retainer and that holds the second multilayer vacuum insulator and the first multilayer vacuum insulators.

8 Claims, 5 Drawing Sheets

(51) Int. Cl.
*F16L 59/02* (2006.01)
*F16L 59/12* (2006.01)
*F17C 3/04* (2006.01)
*F16B 5/06* (2006.01)
*F16B 37/06* (2006.01)
*F16B 1/00* (2006.01)

(52) U.S. Cl.
CPC ............ *F16L 59/065* (2013.01); *F16L 59/12* (2013.01); *F17C 3/04* (2013.01); *F16B 2001/0028* (2013.01); *F16L 59/029* (2013.01); *Y10T 428/197* (2015.01); *Y10T 428/231* (2015.01)

(56) References Cited

FOREIGN PATENT DOCUMENTS

| | | |
|---|---|---|
| JP | S55-173799 U | 12/1980 |
| JP | S60-061596 U | 4/1985 |
| JP | 3179473 U | 11/2012 |
| WO | 2014/093058 A2 | 6/2014 |
| WO | 2015/037247 A1 | 3/2015 |
| WO | 2016/084763 A1 | 6/2016 |

THERMAL INSULATING STRUCTURE

TECHNICAL FIELD

The present invention relates to a thermal insulating structure including a multilayer vacuum insulator.

BACKGROUND ART

Conventionally, there is a known thermal insulating structure in which a surface to be thermally insulated (hereinafter, a "to-be-insulated surface") is covered by a multilayer vacuum insulator. For example, FIG. 2 of Patent Literature 1 discloses a thermal insulating structure in which a multilayer vacuum insulator is fixed to a to-be-insulated surface by bolts. Specifically, in the thermal insulating structure, the multilayer vacuum insulator is provided with a plurality of through-holes, and the to-be-insulated surface is provided with a plurality of screw holes. The bolts are screwed into the screw holes through the through-holes, and the multilayer vacuum insulator is held by washers that are engaged with the heads of the bolts.

CITATION LIST

Patent Literature

PTL 1: Japanese Laid-Open Utility Model Application Publication No. S49-132776

SUMMARY OF INVENTION

Technical Problem

However, the multilayer vacuum insulator that covers the to-be-insulated surface has a relatively large area. Therefore, it is difficult to precisely form through-holes in such a large planar multilayer vacuum insulator.

In view of the above, an object of the present invention is to provide a thermal insulating structure that makes it possible to reduce the number of through-holes formed in a multilayer vacuum insulator that covers a to-be-insulated surface.

Solution to Problem

In order to solve the above-described problems, a thermal insulating structure according to the present invention includes: at least two first multilayer vacuum insulators that adjoin each other and that cover a to-be-insulated surface; a retainer that is fixed to the to-be-insulated surface and that protrudes from a boundary between the first multilayer vacuum insulators; a second multilayer vacuum insulator that extends along the boundary and that covers the boundary, the second multilayer vacuum insulator including a through-hole formed therein, in which the retainer is inserted; and a keep plate that is fixed to the retainer and that holds the second multilayer vacuum insulator and the first multilayer vacuum insulators.

According to the above-described configuration, the retainer is disposed by utilizing the boundary between the first multilayer vacuum insulators covering the to-be-insulated surface. This makes it possible to reduce the number of through-holes formed in the first multilayer vacuum insulators, which are large and planar. In addition, since the second multilayer vacuum insulator is band-shaped so as to extend along the boundary between the first multilayer vacuum insulators, the through-hole can be readily formed in such a band-shaped second multilayer vacuum insulator.

The first multilayer vacuum insulators may adjoin each other such that no gap is formed therebetween. According to this configuration, the to-be-insulated surface is not exposed at the boundary between the first multilayer vacuum insulators. This allows the thermal insulating performance of the second multilayer vacuum insulator to be low.

Each of the first multilayer vacuum insulators may be joined to the to-be-insulated surface around the retainer by a pair of hook-and-loop fasteners. According to this configuration, the first multilayer vacuum insulators can be firmly fixed to the to-be-insulated surface.

The pair of hook-and-loop fasteners may be provided such that the pair of hook-and-loop fasteners overlaps the keep plate. According to this configuration, the pressing force of the keep plate is exerted on the pair of hook-and-loop fasteners. This makes it possible to prevent the pair of hook-and-loop fasteners from being detached from each other.

The retainer may be made of glass fiber reinforced plastic. This configuration makes it possible to lower the thermal conductivity of the retainer while keeping the strength of the retainer high. As a result, thermal conduction through the retainer is suppressed.

For example, the thermal insulating structure may include a plurality of the retainers, and a plurality of the through-holes may be formed in the second multilayer vacuum insulator.

The thermal insulating structure may include a plurality of the second multilayer vacuum insulators. Each of the plurality of the second multilayer vacuum insulators may extend between two adjoining retainers of the plurality of the retainers. According to this configuration, since two through-holes are formed in each second multilayer vacuum insulator, the positions of the through-holes in the second multilayer vacuum insulators can be readily made coincide with the positions of the retainers.

At least three of the first multilayer vacuum insulators may be arranged in a particular direction. The retainer may be provided on each of boundaries between the adjoining first multilayer vacuum insulators. The thermal insulating structure may include a plurality of the keep plates. Each of the plurality of the keep plates may be a bar-shaped member whose both end portions are engaged with the respective retainers that are positioned at both sides of a corresponding one of the first multilayer vacuum insulators. According to this configuration, the central portions of the first multilayer vacuum insulators can be held by the keep plates. In addition, each keep plate can be fixed to the retainers by merely bringing both end portions of the keep plate into engagement with the retainers. This makes it possible to readily fix the keep plates.

Advantageous Effects of Invention

The present invention makes it possible to reduce the number of through-holes formed in a multilayer vacuum insulator that covers a to-be-insulated surface.

DESCRIPTION OF EMBODIMENTS

Figure 1:
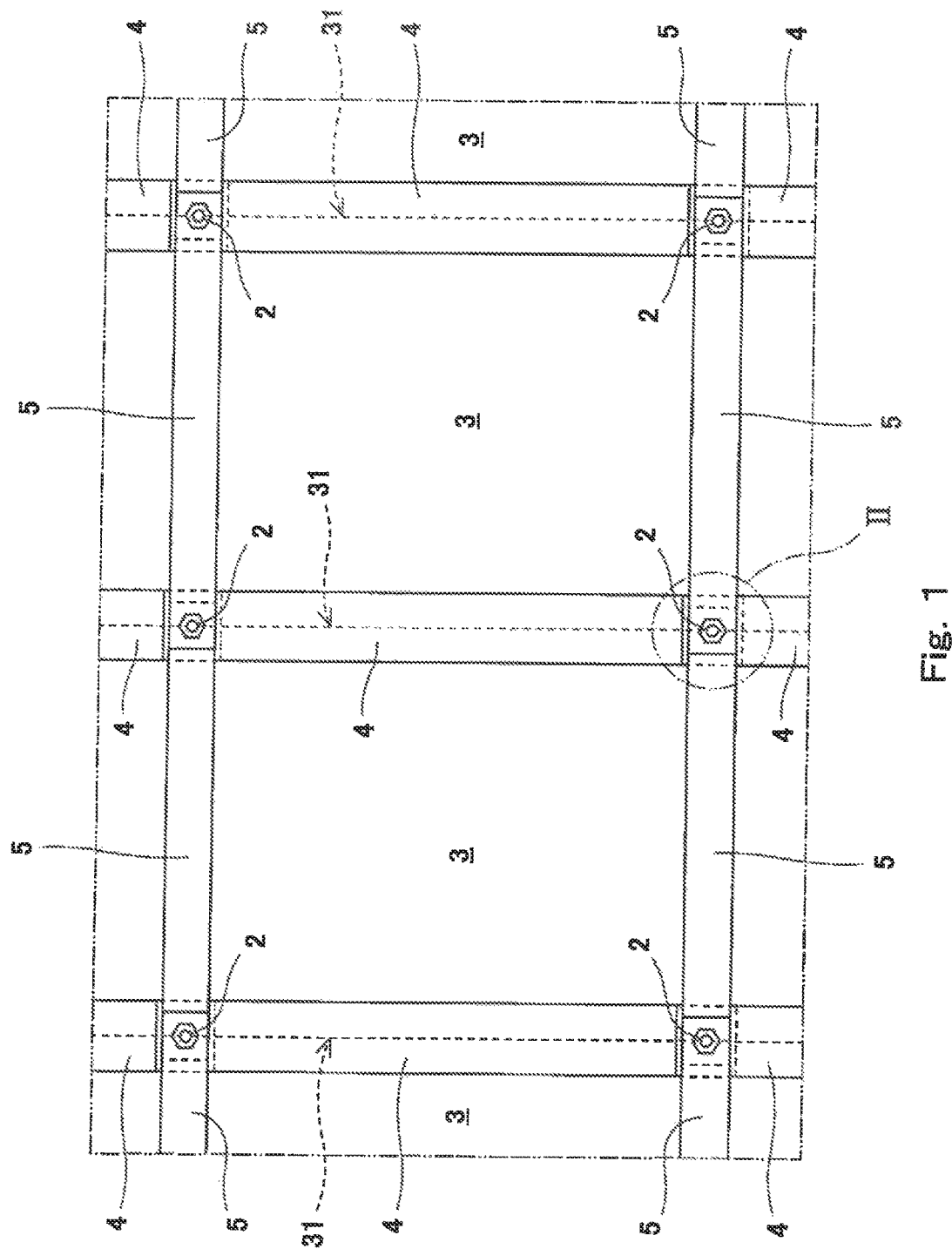
FIG. 1 is a plan view of a thermal insulating structure according to one embodiment of the present invention.

FIGS. 1 to 4 show a thermal insulating structure according to one embodiment of the present invention. The thermal insulating structure is intended for preventing heat from entering to reach a to-be-insulated surface 1 exposed in a vacuum space and preventing heat from being released from the to-be-insulated surface 1.

A structural body 11 including the to-be-insulated surface 1 is, for example, a spherical or cylindrical tank. In this case, the to-be-insulated surface 1 is a curved surface. For example, the tank is a double-shell tank including an inner shell and an outer shell, between which a vacuum space is formed, and the to-be-insulated surface 1 is the outer surface of the inner shell. However, as an alternative, the to-be-insulated surface 1 may be a flat surface. The structural body 11 including the to-be-insulated surface 1 is not limited to a tank, but may be any structural body.

In the present embodiment, since the to-be-insulated surface 1 is large, the to-be-insulated surface 1 is covered by at least three first multilayer vacuum insulators 3. The first multilayer vacuum insulators 3 are arranged in a particular direction (in FIG. 1, in the right-left direction), and adjoin each other. Each of boundaries 31 between the adjoining first multilayer vacuum insulators 3 is covered by a plurality of second multilayer vacuum insulators 4. The term "boundary 31" herein refers to a region between facing sides of first multilayer vacuum insulators 3.

It should be noted that, in a case where the to-be-insulated surface 1 is small, at least two first multilayer vacuum insulators 3 may be provided. In this case, only one second multilayer vacuum insulator 4 may be provided.

Each of the first multilayer vacuum insulators 3 is large and planar. To be more specific, each first multilayer vacuum insulator 3 is rectangular and long in a direction perpendicular to the particular direction. In other words, the first multilayer vacuum insulators 3 are arranged in their width direction. On the other hand, each of the second multilayer vacuum insulators 4 is band-shaped so as to extend along the corresponding boundary 31. However, the shape of each first multilayer vacuum insulator 3 need not be rectangular, but may be, for example, triangular or trapezoidal.

Each of the first multilayer vacuum insulators 3 and the second multilayer vacuum insulators 4 has, for example, a structure in which radiation shield films and spacers are layered alternately. Each radiation shield film is formed by, for example, vapor-depositing aluminum (or gold or silver) onto the surface of a resin sheet. Each spacer is a sheet having low thermal conductivity. Such a sheet may be made of, for example, a resin net, woven fabric, non-woven fabric, paper, or a glass fiber material.

A plurality of retainers 2 are provided on each boundary 31 between adjoining first multilayer vacuum insulators 3. Each retainer 2 is fixed to the to-be-insulated surface 1, and protrudes from the boundary 31.

In the present embodiment, the first multilayer vacuum insulators 3 adjoin each other such that no gap is formed therebetween. In other words, end surfaces of the first multilayer vacuum insulators 3 are in surface contact with each other. Therefore, before keep plates 5 (which will be described below) are fixed to the retainers 2, as indicated by two-dot chain lines in FIG. 4, end portions of the first multilayer vacuum insulators 3 are raised at the positions of the retainers 2. By fixing the keep plates 5 to the retainers 2, these raised end portions of the first multilayer vacuum insulators 3 are flattened.

Each of the retainers 2 is a bar-shaped member extending vertically from the to-be-insulated surface 1. Also, in the present embodiment, each retainer 2 is made of glass fiber reinforced plastic (GFRP). For this reason, fixed plates 12 are joined to the to-be-insulated surface 1 at positions corresponding to the respective retainers 2. For example, the fixed plates 12 are joined to the to-be-insulated surface 1 by welding or fixing by screws.

Each of the fixed plates 12 has a substantially square shape, and a screw hole 13 is formed in its center. It should be noted that the fixed plates 12 may be eliminated, and screw holes 13 may be directly formed in the to-be-insulated surface 1. On one end of each retainer 2, a thread that is screwed into a corresponding one of the screw holes 13 is formed.

However, fixing each retainer 2 to the to-be-insulated surface 1 need not be done by a screwing structure. As one example, a flange may be formed on one end of each retainer 2, and the flange may be sandwiched by the fixed plate 12 and the to-be-insulated surface 1. Each retainer 2 need not be made of GFRP. As one example, each retainer 2 may be made of metal. In this case, each retainer 2 may be fixed to the to-be-insulated surface 1 by welding.

Each second multilayer vacuum insulator 4 extends along the boundary 31 between two adjoining retainers 2. Accordingly, around each retainer 2, end portions of adjoining second multilayer vacuum insulators 4 overlap each other. Through-holes 41, in which respective retainers 2 are inserted, are formed in both end portions of each second multilayer vacuum insulator 4.

Figure 2:
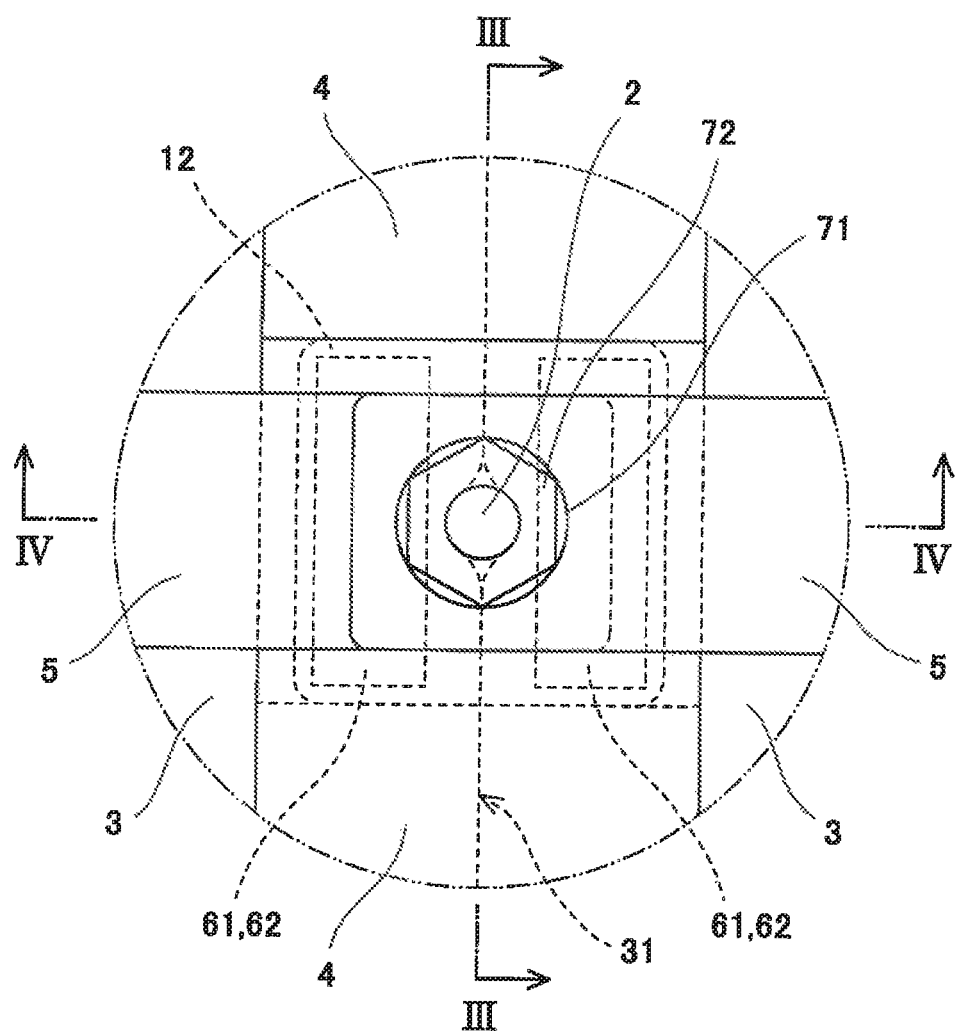
FIG. 2 is an enlarged view of a portion indicated by II in FIG. 1.
Figure 3:
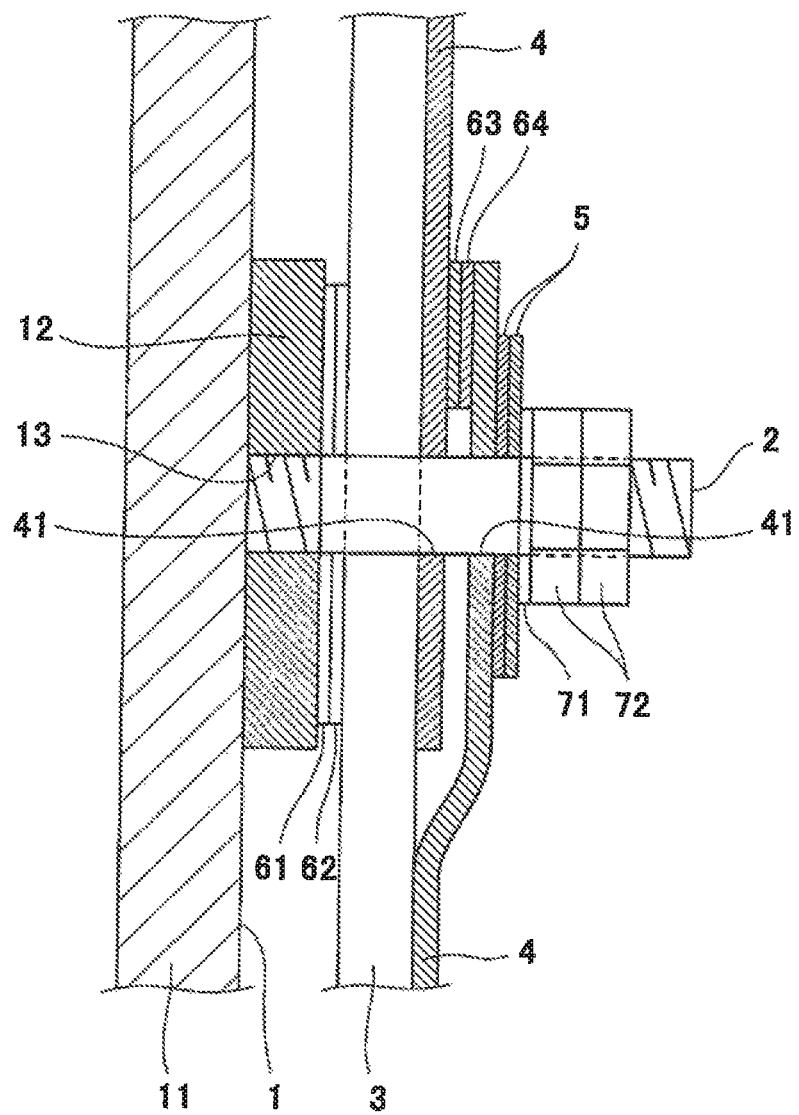
FIG. 3 is a sectional view taken along line III-III of FIG. 2.
Figure 4:
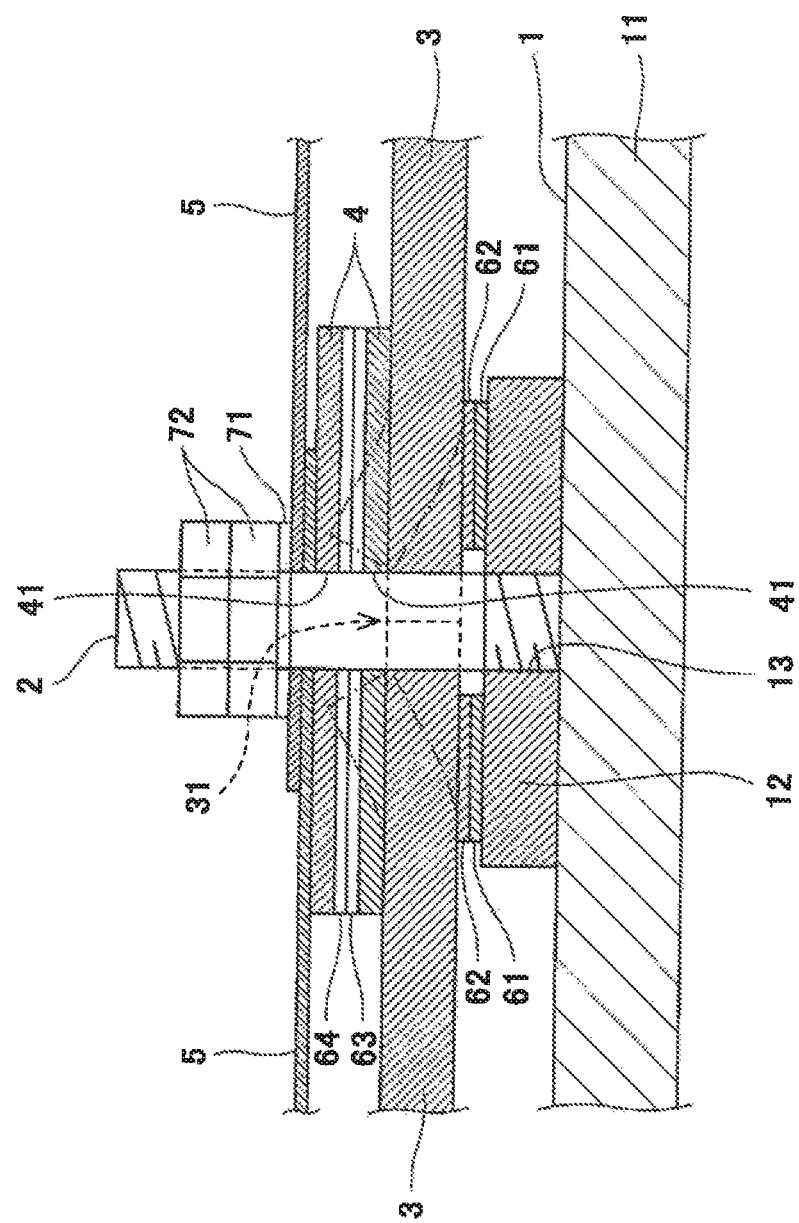
FIG. 4 is a sectional view taken along line IV-IV of FIG. 2.

End portions of adjoining second multilayer vacuum insulators 4 are joined together by a pair of hook-and-loop fasteners 63 and 64 (in FIG. 2, the hook-and-loop fasteners 63 and 64 are not shown for simplifying the drawing). In the present embodiment, it is assumed that the temperature of the to-be-insulated surface 1 will become extremely low. In such an extremely low temperature environment, adhesives cannot be used. For this reason, the hook-and-loop fasteners 63 and 64 are attached to the respective second multilayer vacuum insulators 4 by suturing.

A plurality of keep plates 5 for holding the first multilayer vacuum insulators 3 and the second multilayer vacuum insulators 4 are fixed to the retainers 2. Each of the keep plates 5 is a bar-shaped member whose both end portions are engaged with respective retainers 2 that are positioned at both sides of a corresponding one of the first multilayer vacuum insulators 3. Each keep plate 5 is made of metal, for example. In the present embodiment, the retainers 2 are arranged also in the particular direction. Accordingly, each keep plate 5 extends in the particular direction. However, as an alternative, the positions of the retainers 2 on adjoining boundaries 31 may be displaced from each other, and each keep plate 5 may extend diagonally.

Around each retainer 2, end portions of adjoining keep plates 5 overlap each other. Through-holes in which respective retainers 2 are inserted are formed in both end portions of each keep plate 5. However, instead of the through-holes, notches in which respective retainers 2 are fitted may be formed in both end portions of each keep plate 5.

In the present embodiment, each keep plate 5 is fixed to the retainers 2 by nuts 72. Each nut 72 is screwed with a thread formed on the other end of a corresponding one of the retainers 2. Washers 71 are interposed between the keep plates 5 and the nuts 72.

However, it is not necessary to use the nuts 72 for fixing the keep plates 5 to the retainers 2, but various methods are adoptable for fixing the keep plates 5 to the retainers 2. For example, an annular groove continuous in the circumferential direction may be formed in each retainer 2, and an engagement piece that fits in the annular groove may be formed on each of insertion holes of the keep plates 5. In a case where each retainer 2 is a headed bolt, the keep plates 5 may be fixed to the retainers 2 by the pressing force of the heads of the retainers 2.

Around each retainer 2, the first multilayer vacuum insulators 3 are each joined to the to-be-insulated surface 1 by a pair of hook-and-loop fasteners 61 and 62. The hook-and-loop fasteners 61 and 62 are provided such that they overlap the keep plates 5. In the present embodiment, one hook-and-loop fastener 61 is attached, by screw-fixing, to the to-be-insulated surface 1 via the fixed plate 12, and the other hook-and-loop fastener 61 is attached, by suturing, to the first multilayer vacuum insulator 3.

As described above, in the thermal insulating structure of the present embodiment, the retainers 2 are disposed by utilizing the boundaries 31 between the first multilayer vacuum insulators 3 covering the to-be-insulated surface 1. This makes it possible to reduce the number of through-holes formed in the first multilayer vacuum insulators 3, which are large and planar (in the present embodiment, reduced to zero). In addition, since the second multilayer vacuum insulators 4 are band-shaped so as to extend along the boundaries 31 between the first multilayer vacuum insulators 3, the through-holes 41 can be readily formed in such band-shaped second multilayer vacuum insulators 4.

Moreover, in the present embodiment, each retainer 2 is made of GFRP. This makes it possible to lower the thermal conductivity of each retainer 2 while keeping the strength of each retainer 2 high. As a result, thermal conduction through the retainers 2 is suppressed.

Furthermore, in the present embodiment, since the keep plates 5 extend in a manner to traverse the first multilayer vacuum insulators 3, the central portions of the first multilayer vacuum insulators 3 can be held by the keep plates 5. In addition, each keep plate 5 can be fixed to the retainers 2 by merely bringing both end portions of the keep plate 5 into engagement with the retainers 2. This makes it possible to readily fix the keep plates 5.

(Variations)

The present invention is not limited to the above-described embodiment. Various modifications can be made without departing from the spirit of the present invention.

As one example, each keep plate 5 may be a bar-shaped member with such a length that the keep plate 5 extends between three or more retainers 2. As another example, the keep plates 5, which are bar-shaped members, may be disposed such that they cross each other in an X shape near the center of each first multilayer vacuum insulator 3.

Figure 5:
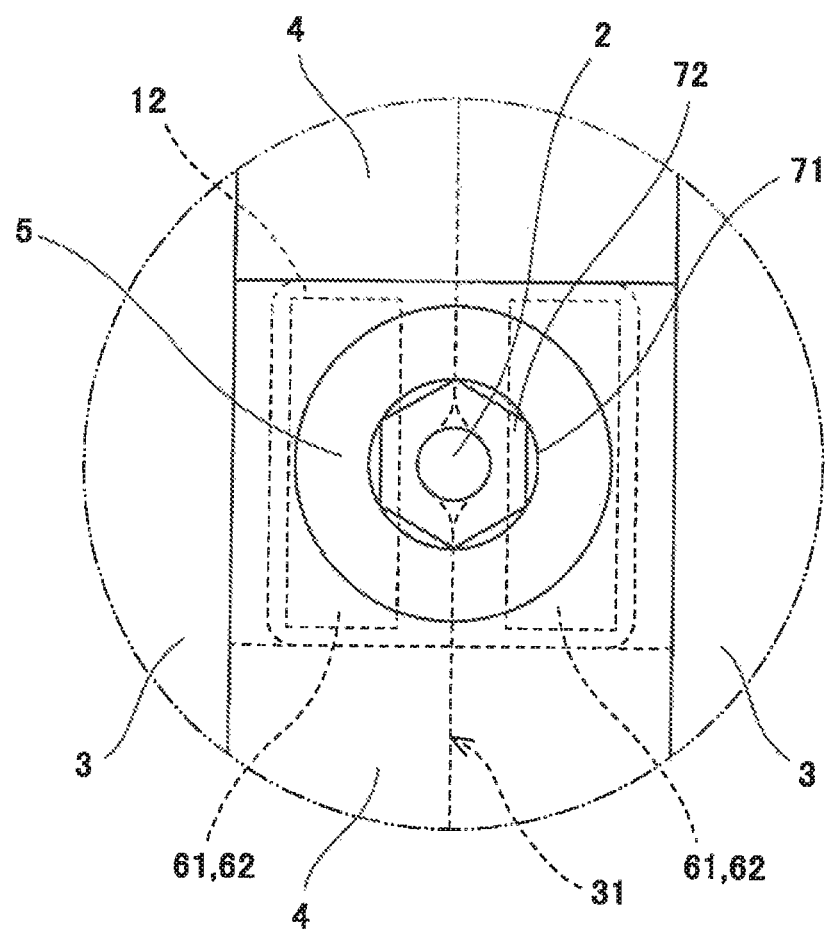
FIG. 5 is a plan view of a part of the thermal insulating structure according to one variation.

Each keep plate 5 need not be a bar-shaped member, and as shown in FIG. 5, each keep plate 5 may be discoid. Although not illustrated, the keep plate 5 may be, for example, a single mesh member (e.g., expanded metal or perforated metal) that covers adjoining two first multilayer vacuum insulators 3 and that is fixed to retainers 2 in a three-by-two arrangement, i.e., two parallel rows of three laterally arranged retainers 2. The mesh member may have a size that covers three or more first multilayer vacuum insulators 3. Alternatively, each retainer 2 may be a clamping band that can be tied to a clasp fixed to the to-be-insulated surface 1, or may be a bent metal piece.

Each second multilayer vacuum insulator 4 may have a length that is the same as the length of the boundary 31 between the first multilayer vacuum insulators 3, and three or more through-holes 41 may be formed in each second multilayer vacuum insulator 4. However, in a case where a plurality of second multilayer vacuum insulators 4 are provided for each boundary 31 and two through-holes 41 are formed in each second multilayer vacuum insulator 4 as in the above-described embodiment, the positions of the through-holes 41 in the second multilayer vacuum insulators 4 can be readily made coincide with the positions of the retainers 2.

In the above-described embodiment, the first multilayer vacuum insulators 3 are fixed to the to-be-insulated surface 1 by the pairs of hook-and-loop fasteners 61 and 62 around the retainers 2. However, the hook-and-loop fasteners 61 and 62 may be eliminated. The reason for this is that, even without the hook-and-loop fasteners 61 and 62, the first multilayer vacuum insulators 3 are fixed to the to-be-insulated surface 1 by the pressing force of the keep plates 5. However, with the presence of the hook-and-loop fasteners 61 and 62, the first multilayer vacuum insulators 3 can be firmly fixed to the to-be-insulated surface 1. Moreover, in the above-described embodiment, since the hook-and-loop fasteners 61 and 62 are provided such that they overlap the keep plates 5, the pressing force of the keep plates 5 is exerted on the hook-and-loop fasteners 61 and 62. This makes it possible to prevent the hook-and-loop fasteners 61 and 62 from being detached from each other.

A gap may be formed between the first multilayer vacuum insulators 3. However, in a case where no gap is formed between the first multilayer vacuum insulators 3 as in the above-described embodiment, the to-be-insulated surface 1 is not exposed at the boundary 31 between the first multilayer vacuum insulators 3. This allows the thermal insulating performance of each second multilayer vacuum insulator 4 to be low.

INDUSTRIAL APPLICABILITY

The present invention is not only applicable to a tank but widely applicable to various structures, such as a space structure.

REFERENCE SIGNS LIST 1 to-be-insulated surface
2 retainer
3 first multilayer vacuum insulator
31 boundary
4 second multilayer vacuum insulator
41 through-hole
5 keep plate
61 to 64 hook-and-loop fastener

The invention claimed is:

1. A thermal insulating structure comprising:
at least two first multilayer vacuum insulators that adjoin each other and that cover a to-be-insulated surface;
a retainer that is fixed to the to-be-insulated surface and that protrudes from a boundary between the first multilayer vacuum insulators;
a second multilayer vacuum insulator that extends along the boundary and that covers the boundary, the second multilayer vacuum insulator including a through-hole formed therein, in which the retainer is inserted; and a keep plate that is fixed to the retainer and that holds the second multilayer vacuum insulator and the first multilayer vacuum insulators.

2. The thermal insulating structure according to claim 1, wherein
the first multilayer vacuum insulators adjoin each other such that no gap is formed therebetween.

3. The thermal insulating structure according to claim 1, wherein
each of the first multilayer vacuum insulators is joined to the to-be-insulated surface around the retainer by a pair of hook-and-loop fasteners.

4. The thermal insulating structure according to claim 3, wherein
the pair of hook-and-loop fasteners is provided such that the pair of hook-and-loop fasteners overlaps the keep plate.

5. The thermal insulating structure according to claim 1, wherein
the retainer is made of glass fiber reinforced plastic.

6. The thermal insulating structure according to claim 1, comprising a plurality of the retainers, wherein
a plurality of the through-holes are formed in the second multilayer vacuum insulator.

7. The thermal insulating structure according to claim 6, comprising a plurality of the second multilayer vacuum insulators, wherein
each of the plurality of the second multilayer vacuum insulators extends between two adjoining retainers of the plurality of the retainers.

8. The thermal insulating structure according to claim 1, wherein
at least three of the first multilayer vacuum insulators are arranged in a particular direction,
the retainer is provided on each of boundaries between the adjoining first multilayer vacuum insulators,
the thermal insulating structure comprises a plurality of the keep plates, and
each of the plurality of the keep plates is a bar-shaped member whose both end portions are engaged with the respective retainers that are positioned at both sides of a corresponding one of the first multilayer vacuum insulators.

* * * * *